(12) United States Patent
Kaleta et al.

(10) Patent No.: US 11,410,799 B2
(45) Date of Patent: Aug. 9, 2022

(54) METHOD AND APPARATUS FOR SEALING A WIRING HARNESS

(71) Applicant: Aptiv Technologies Limited, St. Michael (BB)

(72) Inventors: Arkadiusz Kaleta, Gdów (PL); Pawel Forys, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 462 days.

(21) Appl. No.: 16/560,439

(22) Filed: Sep. 4, 2019

(65) Prior Publication Data

US 2020/0090837 A1    Mar. 19, 2020

(30) Foreign Application Priority Data

Sep. 14, 2018 (EP) .................................. 18194633

(51) Int. Cl.
*H01B 13/012* (2006.01)
*B29C 53/80* (2006.01)
(Continued)

(52) U.S. Cl.
CPC ..... *H01B 13/01281* (2013.01); *B29C 53/562* (2013.01); *B29C 53/8041* (2013.01);
(Continued)

(58) Field of Classification Search
CPC ............ H01B 13/012; H01B 13/01209; H01B 13/01236; H01B 13/01245;
(Continued)

(56) References Cited

U.S. PATENT DOCUMENTS 9,758,114 B1 * 9/2017 Volpone .............. B60R 16/0222
2002/0125024 A1   9/2002 Yashima et al.

FOREIGN PATENT DOCUMENTS

CN       1365123 A    8/2002
CN    202917255 U    5/2013
(Continued)

OTHER PUBLICATIONS

Chinese Office Action for Chinese Application No. 201910863226.7, dated Sep. 3, 2020, 7 pages.

*Primary Examiner* — Carson Gross
(74) *Attorney, Agent, or Firm* — Billion & Armitage

(57) ABSTRACT

A method of sealing a wiring-harness includes the steps of: a) dispensing a length of a sealing-tape onto a platform, the sealing-tape having a first-surface and a second-surface opposite the first-surface. b) separating a plurality of wire-cables from a portion of the wiring-harness. c) applying the plurality of wire-cables to a first-half of the first-surface of the sealing-tape. d) folding a second-half of the sealing-tape over the separated plurality of wire-cables such that the second-half overlays the first-half. e) pressing the second-half of the sealing-tape such that the second-half contacts the first-half between the separated plurality of wire-cables, thereby forming a cable-band. f) coiling the cable-band into a generally cylindrical-shaped seal. g) compressing the cylindrical-shaped seal isostatically such that interstitial-voids within the cylindrical-shaped seal are reduced in size. An apparatus for sealing a wiring-harness is also provided.

14 Claims, 9 Drawing Sheets

(51) Int. Cl.
   *B29C 53/56* (2006.01)
   *B29L 31/30* (2006.01)
   *B60R 16/02* (2006.01)

(52) U.S. Cl.
   CPC . *H01B 13/01209* (2013.01); *H01B 13/01236* (2013.01); *B29L 2031/30* (2013.01); *B60R 16/0222* (2013.01)

(58) Field of Classification Search
   CPC ........ H01B 13/01218; H01B 13/01227; B60R 16/0207; B29C 63/04; B29C 63/06; B29C 53/56; B29C 53/562; B29C 53/566; B29C 53/8041
   See application file for complete search history.

(56) References Cited

FOREIGN PATENT DOCUMENTS

| | | | |
|---|---|---|---|
| CN | 105048173 A | | 11/2015 |
| CN | 105374469 A | | 3/2016 |
| JP | 2003235130 A | * | 8/2003 |
| JP | 2003235130 A | | 8/2003 |
| JP | 2010009924 A | * | 1/2010 |
| WO | 01/67575 A1 | | 9/2001 |

\* cited by examiner

METHOD AND APPARATUS FOR SEALING A WIRING HARNESS

CROSS-REFERENCE TO RELATED APPLICATION

This application claims the benefit under 35 U.S.C. § 119(a) of European Patent Application No. 18194633.6, filed on Sep. 14, 2018, the entire contents of which are incorporated herein by reference.

TECHNICAL FIELD OF THE INVENTION

The present invention relates generally to a wiring-harness for a vehicle.

BACKGROUND OF THE INVENTION

The present invention relates more particularly to sealing a wiring-harness for a vehicle to prevent liquids from transporting along the length of the wiring-harness.

Typical seals for wiring-harnesses are applied by hand resulting in increased manufacturing times, and significant variation in dimensional-control and leakage.

SUMMARY OF THE INVENTION

The present invention proposes to solve the above mentioned problem by providing a method of sealing a wiring-harness, The method includes a step of providing an apparatus configured to feed a wiring-harness through a sealing-process. The sealing-process includes the steps of:
- a) dispensing, with a dispensing-device, a length of a sealing-tape onto a platform along a longitudinal-axis of the platform, the sealing-tape having a first-surface and a second-surface opposite the first-surface, the second-surface in contact with the platform.
- b) separating a plurality of wire-cables from a portion of the wiring-harness with a separation-device, the separation-device configured to retain the plurality of wire-cables such that the plurality of wire-cables are generally parallel and evenly spaced.
- c) applying, with a handling-device, the separated plurality of wire-cables to the first-surface of the sealing-tape along a lateral-axis of the platform, the lateral-axis orthogonal to the longitudinal-axis. The separated plurality of wire-cables are applied over generally a first-half of the length of the sealing-tape.
- d) folding, with a folding-device, a second-half of the sealing-tape over the separated plurality of wire-cables such that the second-half overlays the first-half.
- e) pressing the second-half of the sealing-tape along a vertical-axis of the platform, with a pressing-device, the vertical-axis orthogonal to both the longitudinal-axis and the lateral-axis, such that the second-half contacts the first-half between the separated plurality of wire-cables, thereby forming a cable-band.
- f) coiling the cable-band along the longitudinal-axis into a generally cylindrical-shaped seal, with a coiling-device, such that the second-surface of the sealing-tape is in direct contact with the first-surface of the sealing-tape. and
- g) compressing the cylindrical-shaped seal isostatically, with the coiling-device, such that interstitial-voids within the cylindrical-shaped seal are reduced in size.

Preferably the method further comprises the steps of:
- h) wrapping the cylindrical-shaped seal and a portion of the plurality of wire-cables extending beyond the cylindrical-shaped seal in a polymer-film with a wrapping-device.
- i) inserting the cylindrical-shaped seal into a sealing-grommet with the handling-device.
- j) leak-testing the cylindrical-shaped seal at room temperature for 50-seconds at 200 mbar delta pressure with a leak-test-device.

Step b) may include the step of:
- b1) separating the plurality of wire-cables in a range of 2 mm to 5 mm apart from one another.

Step e) may include the step of:
- e1) pressing with a pressing-force of between 100-Newtons and 300-Newtons.

Step g) may include the step of:
- g1) compressing with an isostatic-force of between 40-Newtons and 200-Newtons.

The above method may be conducted in a temperature range between 10° Celsius and 38° Celsius.

The present invention also proposes an apparatus for sealing a wiring-harness. The apparatus includes a handling-device, a platform, a dispensing-device, a separation-device, a folding-device, a pressing-device, a coiling-device, and a controller-circuit. The handling-device is configured to manipulate the wiring-harness. The platform is configured to receive a length of a sealing-tape along a longitudinal-axis of the platform. The dispensing-device is configured to dispense the sealing-tape onto the platform. The separation-device is configured to separate a plurality of wire-cables within the wiring-harness. The separation-device is further configured to retain the plurality of wire-cables such that the plurality of wire-cables are generally parallel and evenly spaced. The folding-device is configured to fold the sealing-tape over the separated plurality of wire-cables. The pressing-device is configured to press the sealing-tape and separated plurality of wire-cables into a cable-band. The coiling-device is configured to coil the cable-band. The controller-circuit is in communication with the handling-device, the platform, the dispensing-device, the separation-device, the folding-device, the pressing-device, and the coiling-device. The controller-circuit is configured to present the wiring-harness into the apparatus with the handling-device, to dispense the length of the sealing-tape onto the platform with the dispensing-device. The sealing-tape has a first-surface and a second-surface opposite the first-surface. The second-surface is in contact with the platform. The controller-circuit is configured to separate the plurality of wire-cables by placing a portion of the wiring-harness into the separation-device with the handling-device. The controller-circuit is configured to apply the separated plurality of wire-cables to the first-surface of the sealing-tape along a lateral-axis of the platform with the handling-device. The lateral-axis is orthogonal to the longitudinal-axis. The handling-device places the separated plurality of wire-cables onto a first-half of the length of the sealing-tape. The controller-circuit is configured to fold a second-half of the sealing-tape over the separated plurality of wire-cables, with the folding-device, such that the second-half overlays the first-half. The controller-circuit is configured to press the second-half of the sealing-tape along a vertical-axis of the platform with the pressing-device. The vertical-axis is orthogonal to both the longitudinal-axis and the lateral-axis. The second-half contacts the first-half between the separated plurality of wire-cables thereby forming the cable-band. The controller-circuit is configured to coil the cable-band, with the coiling-device, along the longitudinal-axis into a generally cylindrical-shaped seal such that the second-surface of the sealing-tape is in direct contact with the first-surface of the sealing-tape. The controller-circuit is configured to compress the cylindrical-shaped seal isostatically, with the coiling-device, such that interstitial-voids within the cylindrical-shaped seal are reduced in size.

According to other advantageous features of the present invention:

the apparatus further includes a wrapping-device in communication with the controller-circuit, wherein the controller-circuit is further configured to wrap the cylindrical-shaped seal and a portion of the wire-cables extending beyond the cylindrical-shaped seal in a polymer-film.

the apparatus further includes an insertion-device in communication with the controller-circuit, wherein the controller-circuit is further configured to insert the cylindrical-shaped seal into a sealing-grommet.

the separation-device includes a plurality of pairs of opposed wire-separators aligned along the lateral-axis, the plurality of pairs of opposed wire-separators evenly spacing the plurality of wire-cables apart from one another, the plurality of pairs of opposed wire-separators each having a first-leg and a second-leg connected by an arc, the first-leg parallel to the second-leg, the plurality of pairs of opposed wire-separators exerting a clamping-force on the separated plurality of wire-cables disposed between adjacent pairs of opposed wire-separators.

the handling-device includes grippers actuated by the controller-circuit, the grippers holding the wiring-harness parallel to the lateral-axis and inhibiting movement of the wiring-harness along the lateral-axis.

the coiling-device includes a generally C-shaped flexible-band having a fixed-end and a moving-end, the C-shaped portion of the flexible-band receiving the cable-band, whereby the moving-end is moved beyond the fixed-end imparting a coiling-motion on the cable-band.

the coiling-device further includes a sliding-block attached to the moving-end of the flexible-band, the sliding-block actuated by the controller-circuit, whereby the sliding-block moves the moving-end along the longitudinal-axis beyond the fixed-end thereby coiling and compressing the cable-band.

the coiling-device further includes a pair of concentric semi-circular arcs defining an inner-arc and an outer-arc, the inner-arc attached to the moving-end of the flexible-band, the inner-arc actuated by the controller-circuit and rotatable from an open-position to a closed-position, the outer-arc attached to the fixed-end of the flexible-band, whereby the inner-arc rotates the moving-end along the longitudinal-axis beyond the fixed-end thereby coiling and compressing the cable-band.

BRIEF DESCRIPTION OF THE DRAWINGS

The present invention is now described by way of example with reference to the accompanying drawings in which.

DESCRIPTION OF THE PREFERRED EMBODIMENTS

Figure 1:
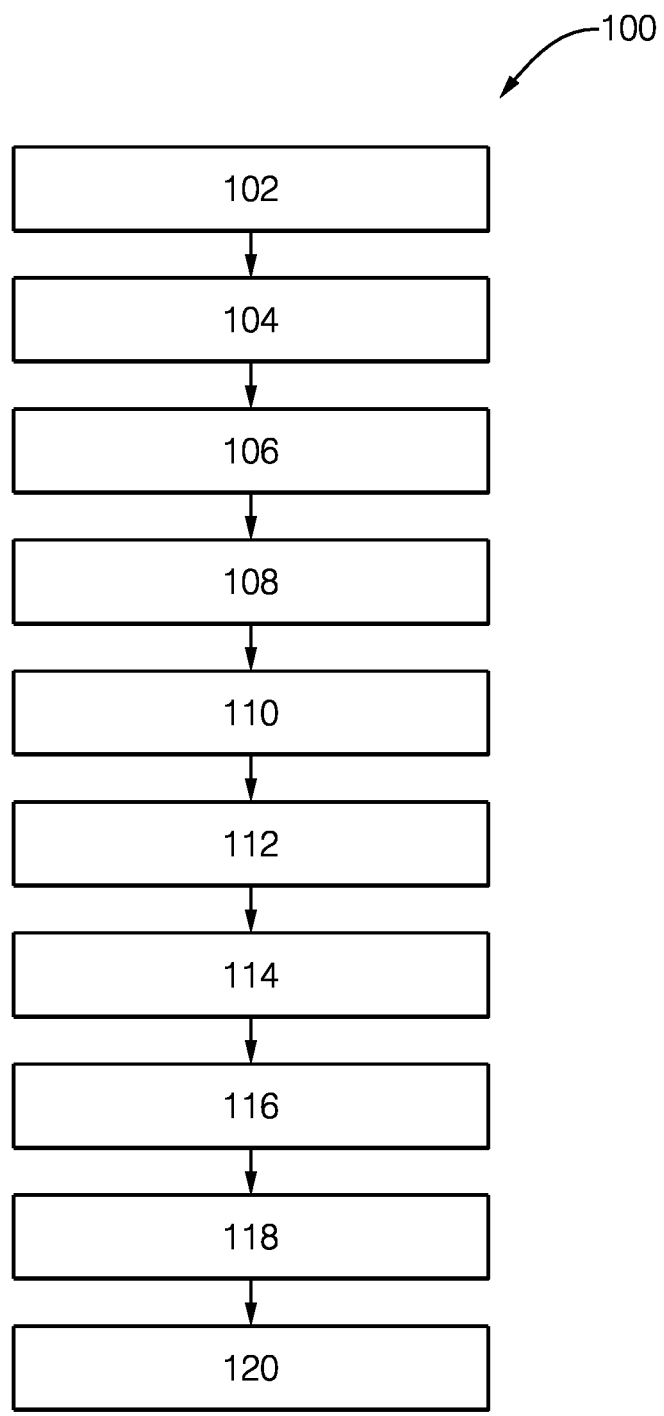
FIG. 1 is a flow diagram illustrating a method of sealing a wiring-harness according to a preferred embodiment of the invention.

Hereinafter, a method 100 of sealing a wiring-harness 10 according to an embodiment of the present invention will be described with reference to the figures. FIG. 1 is a flow diagram illustrating a method 100 of sealing the wiring-harness 10. The method 100 includes the following steps:

providing an apparatus 12 configured to feed the wiring-harness 10 through a sealing-process. The sealing-process includes the steps of:

a) dispensing 102, with a dispensing-device 14, a length 16 of a sealing-tape 18 onto a platform 20 along a longitudinal-axis 22 of the platform 20, the sealing-tape 18 having a first-surface 24 and a second-surface 26 opposite the first-surface 24, the second-surface 26 in contact with the platform 20.

b) separating 104 a plurality of wire-cables 28 from a portion of the wiring-harness 10 with a separation-device 30, the separation-device 30 configured to retain the plurality of wire-cables 28 such that the plurality of wire-cables 28 are generally parallel and evenly spaced.

c) applying 106, with a handling-device 32, the separated plurality of wire-cables 28 to the first-surface 24 of the sealing-tape 18 along a lateral-axis 34 of the platform 20, the lateral-axis 34 orthogonal to the longitudinal-axis 22.

the separated plurality of wire-cables 28 applied over generally a first-half 36 of the length 16 of the sealing-tape 18.

d) folding 108, with a folding-device 38, a second-half 40 of the sealing-tape 18 over the separated plurality of wire-cables 28 such that the second-half 40 overlays the first-half 36.

e) pressing 110, with a pressing-device 42, the second-half 40 of the sealing-tape 18 along a vertical-axis 44 of the platform 20, the vertical-axis 44 orthogonal to both the longitudinal-axis 22 and the lateral-axis 34, such that the second-half 40 contacts the first-half 36 between the separated plurality of wire-cables 28, thereby forming a cable-band 46.

f) coiling 112, with a coiling-device 48, the cable-band 46 along the longitudinal-axis 22 into a generally cylindrical-shaped seal 50, such that the second-surface 26 of the sealing-tape 18 is in direct contact with the first-surface 24 of the sealing-tape 18. and g) compressing 114, with the coiling-device 48, the cylindrical-shaped seal 50 isostatically, such that interstitial-voids 76 within the cylindrical-shaped seal 50 are reduced in size.

Step b) preferably includes the step of:

b1) separating 104 the plurality of wire-cables 28 in a range of 2 mm to 5 mm apart from one another.

Step e) preferably includes the step of:

e1) pressing 110 with a pressing-force 60 of between 100-Newtons and 300-Newtons.

Step g) preferably includes the step of:

g1) compressing 114 with an isostatic-force 62 of between 40-Newtons and 200-Newtons.

Preferably, the method 100 further includes the step of:

h) wrapping 116, with a wrapping-device 52, the cylindrical-shaped seal 50 and a portion of the wire-cables 28 extending beyond the cylindrical-shaped seal 50 in a polymer-film 54.

Preferably, the method 100 further includes the step of:

i) inserting 118 the cylindrical-shaped seal 50 into a sealing-grommet with the handling-device 32.

Preferably, the method 100 further includes the step of:

j) leak-testing 120 the cylindrical-shaped seal 50 at room temperature for 50-seconds at 200 mbar delta pressure with a leak-test-device 58.

Preferably, the steps of the method 100 described above are conducted in a temperature range between 10 degrees Celsius and 38 degrees Celsius.

Figure 2:
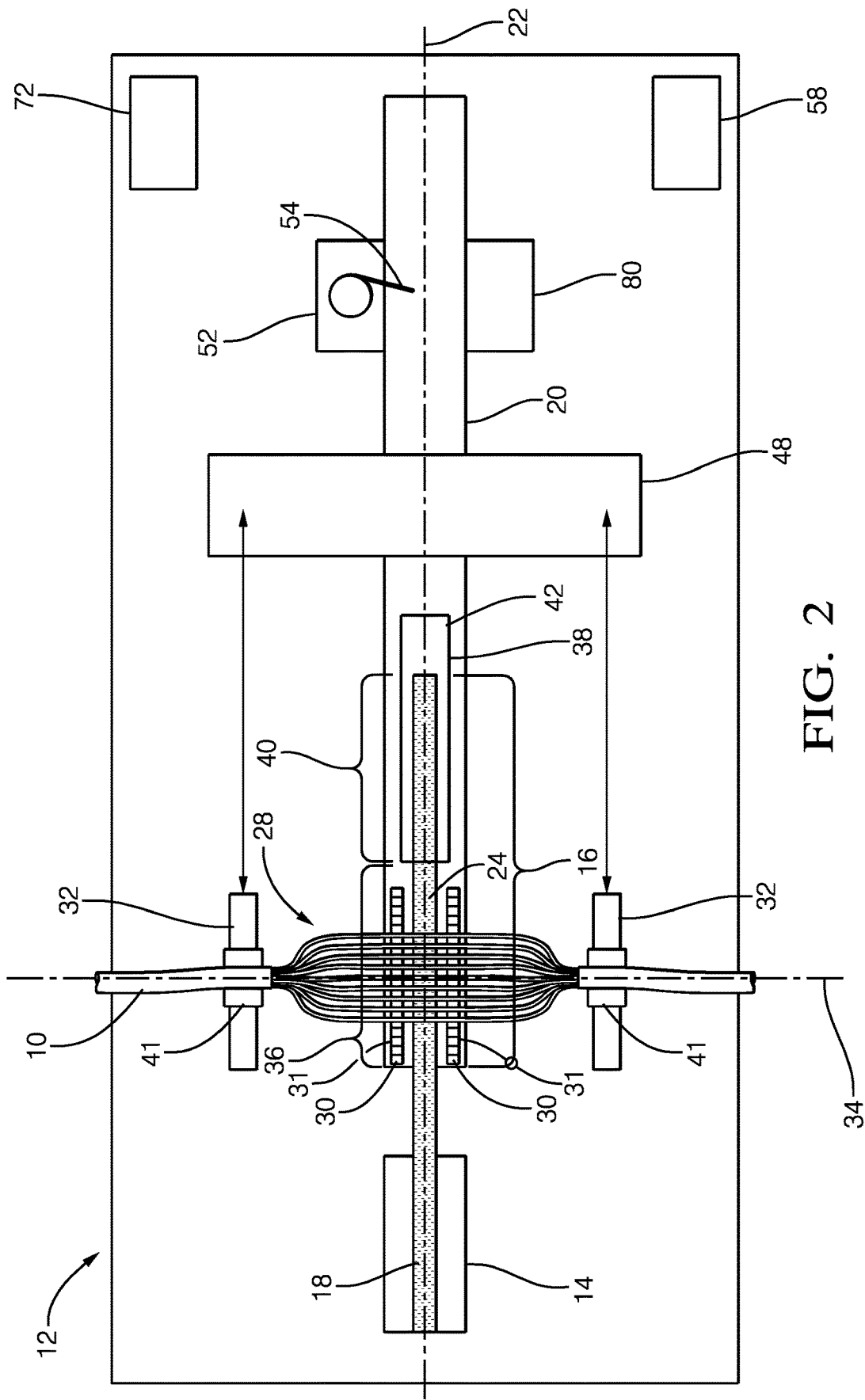
FIG. 2 is an illustration of an apparatus for sealing a wiring-harness.

FIG. 2 is a block diagram illustrating the overall structure of a sealing-apparatus 12, hereafter referred to as the apparatus 12, configured to feed a wiring-harness 10 through a sealing-process. The apparatus 12 includes the handling-device 32 configured to manipulate the wiring-harness 10 through the various stations of the apparatus 12. The wiring-harness 10 typically includes the plurality of wire-cables 28, hereafter referred to as the wire-cables 28. The handling-device 32 includes grippers 41 actuated by the controller-circuit 72. The grippers 41 hold the wiring-harness 10 parallel to the lateral-axis 34 and inhibit movement of the wiring-harness 10 along the lateral-axis 34. The grippers are preferably electrically actuated and grasp the wiring-harness 10 on opposing sides.

The apparatus 12 also includes the platform 20 configured to receive the length 16 of the sealing-tape 18 along the longitudinal-axis 22 of the platform 20, as illustrated in FIG. 2. The platform 20 may include a means of temporarily securing the sealing-tape 18 (not shown), such as a perforated-surface through which a vacuum may be applied to releasably hold the sealing-tape 18 to the platform 20. The platform 20 may include sensors (not shown) for detecting a presence and a position of the sealing-tape 18 and wire-cables 28.

The apparatus 12 also includes the dispensing-device 14 configured to dispense the sealing-tape 18 onto the platform 20 along the longitudinal-axis 22. In one embodiment, the dispensing-device 14 is a reel-type dispensing-device 14 that feeds the sealing-tape 18 from a continuous reel or spool. The dispensing-device 14 includes a cutting-device (not shown) configured to cut the sealing-tape 18 to length 16. In another embodiment, the dispensing-device 14 is a magazine-type dispensing-device 14 that feeds the sealing-tape 18 from a magazine or dispenser in pre-cut lengths 16.

Figure 3A:
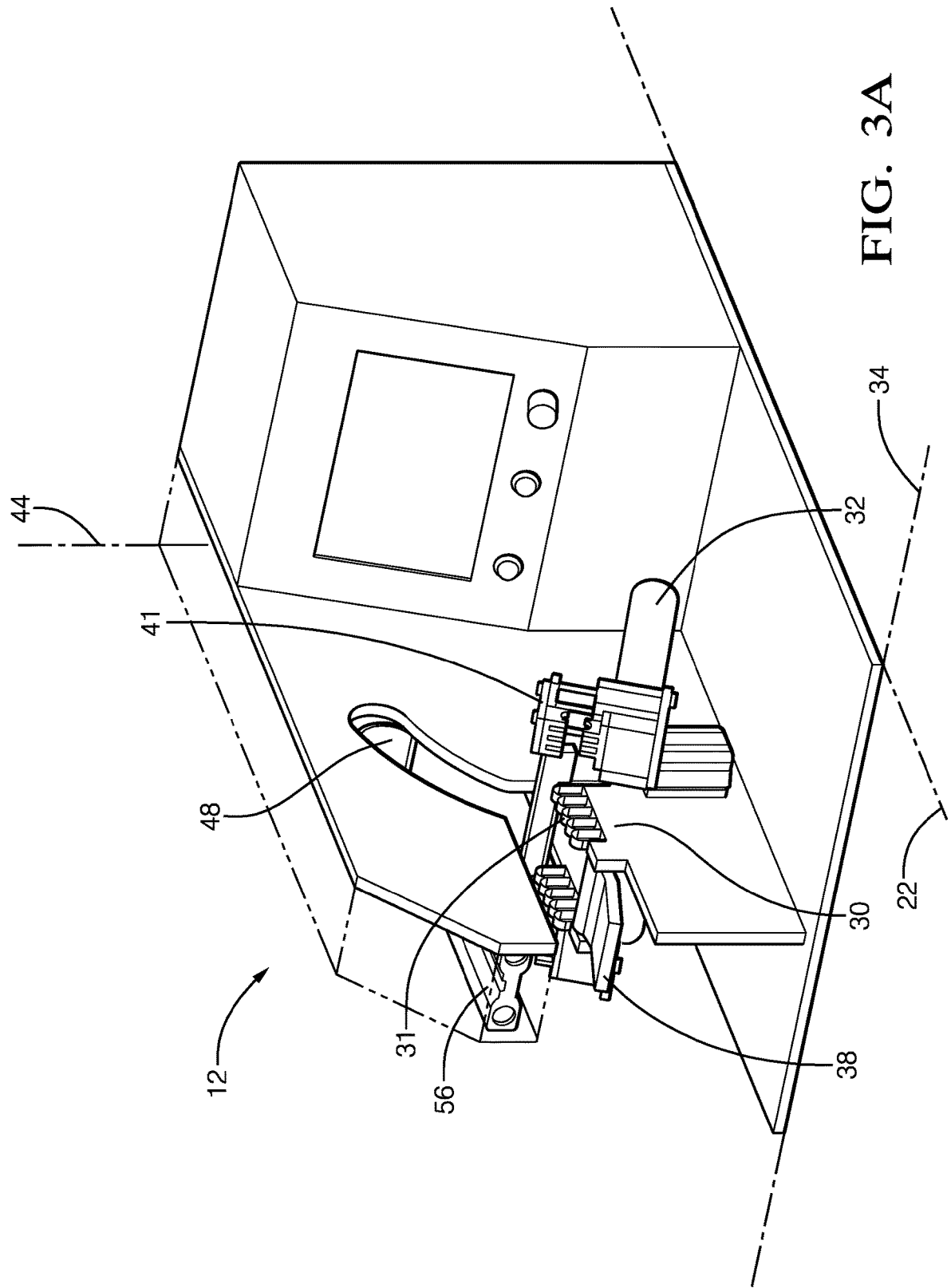
FIG. 3A is a perspective view illustrating the apparatus of FIG. 2.
Figure 3B:
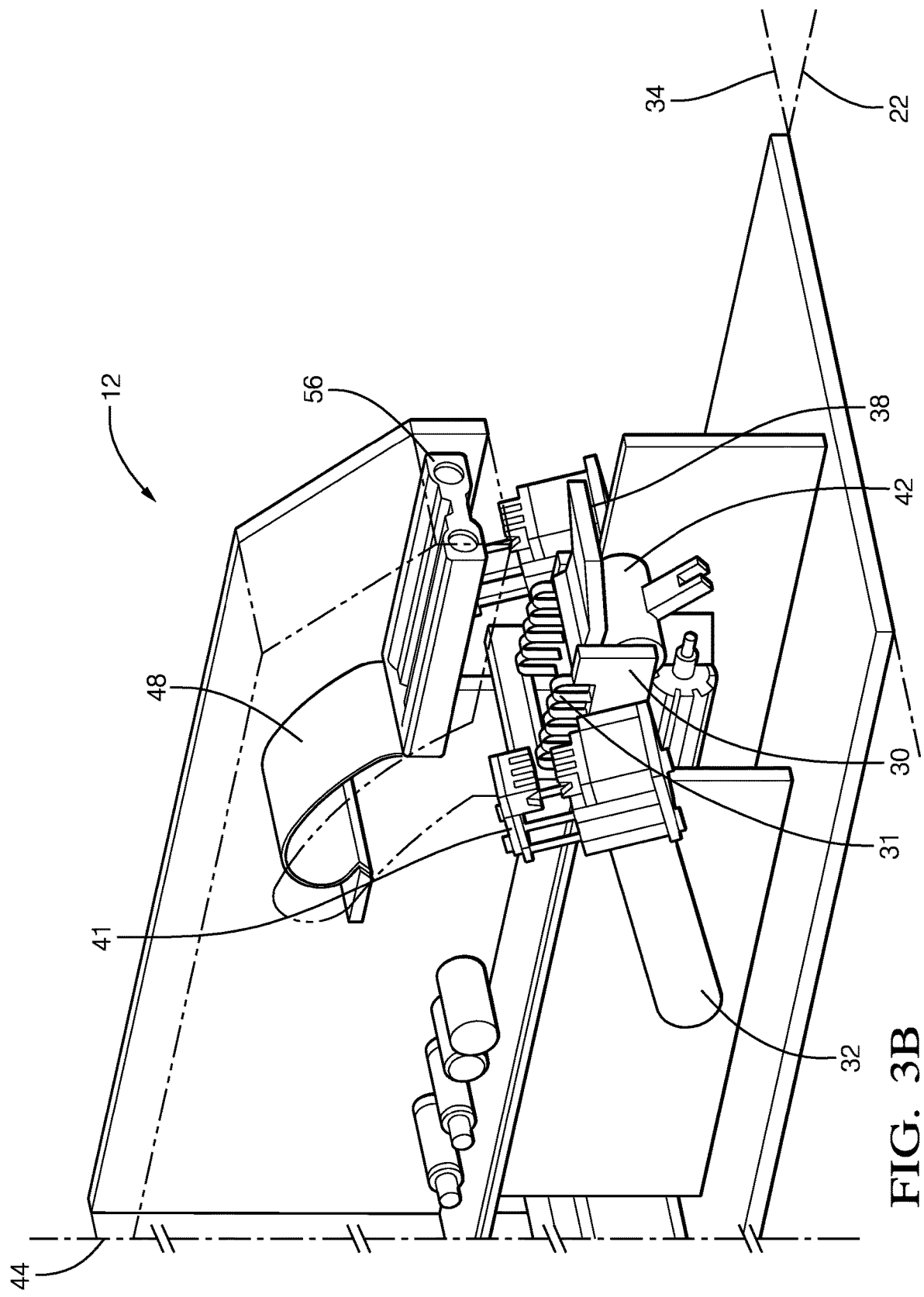
FIG. 3B is another perspective view illustrating the apparatus of FIG. 2.

FIGS. 3A and 3B are perspective views illustrating a portion of the apparatus 12 showing the handling-device 32 and the separation-device 30 with the wiring-harness 10 removed. The handling-device 32 is shown in a neutral-position with the grippers 41 open and ready to receive the wiring-harness 10. Once the wiring-harness 10 is received by the handling-device 32, the grippers 41 grasp the wiring-harness 10 and the handling-device 32 rotates along the vertical-axis 44 and feeds the wire-cables 28 into the separation-device 30. Once the cable-band 46 is formed the handling-device 32 lifts the wiring-harness 10 from the separation-device 30 into the coiling-device 48, as will be described in more detail below.

Figure 4:
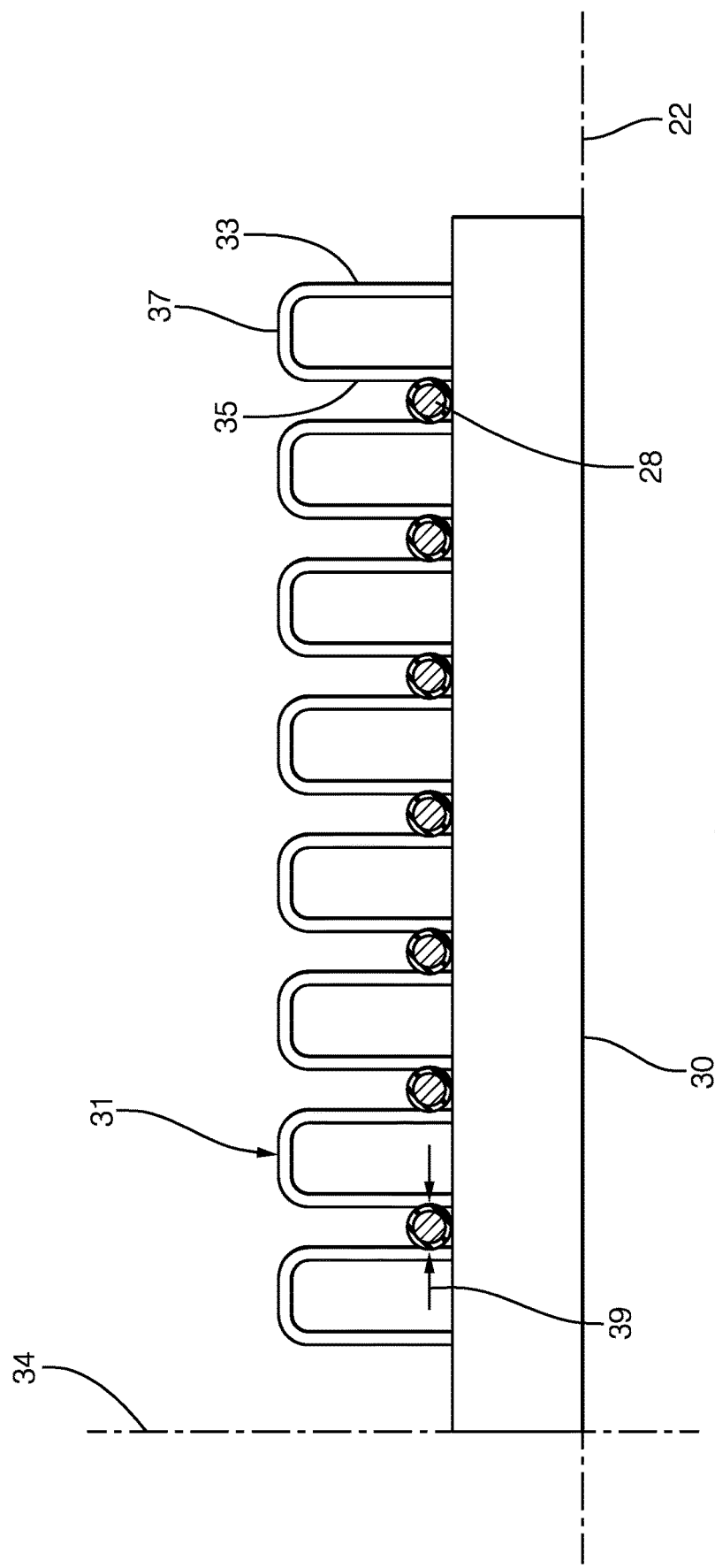
FIG. 4 is a section view illustrating a separation-device of the apparatus of FIG. 2.

FIG. 4 is a side section view of the separation-device 30 isolated from the apparatus 12 of FIG. 3A. The apparatus 12 also includes the separation-device 30 configured to separate the wire-cables 28 within the wiring-harness 10. The separation-device 30 is further configured to retain the wire-cables 28 such that the wire-cables 28 are generally parallel to one another and evenly spaced. That is, the separation-device 30 holds the individual wire-cables 28 to inhibit movement of the wire-cables 28 during the sealing-process. The separation-device 30 may retain any number of wire-cables 28, and preferably retains 20 to 45 wire-cables 28. Preferably, the separation-device 30 evenly spaces the wire-cables 28 in a range of 2 mm to 5 mm apart from one another. Experimentation by the inventors has discovered that the 2 mm separation is sufficient for sealing the wire-cables 28 having a cross-sectional area of less-than or equal to 4 $mm^2$, and the separation of 5 mm is sufficient for sealing the wire-cables 28 having a cross-sectional area greater-than or equal to 4 $mm^2$. The separation-device 30 includes a plurality of pairs of opposed wire-separators 31, hereafter referred to as the wire-separators 31, with each pair aligned along the lateral-axis 34 and successive pairs extending along the longitudinal-axis 22. The wire-separators 31 evenly space the wire-cables 28 apart from one another as described above. The wire-separators 31 each have a first-leg 33 and a second-leg 35 connected by an arc 37. The first-leg 33 is parallel to the second-leg 35 with the arc 37 generally orthogonal to both the first-leg 33 and the second-leg 35. The wire-separators 31 exert a clamping-force 39 on the separated wire-cables 28 disposed between adjacent wire-separators 31 sufficient to inhibit the movement of the wire-cables 28 during the sealing-process. The wire-separators 31 are preferably formed of a spring-steel alloy.

The apparatus 12 also includes the folding-device 38 configured to fold the sealing-tape 18 over the separated wire-cables 28. In one embodiment, the folding-device 38 is recessed into the platform 20 to provide a continuous-surface for the dispensing of the sealing-tape 18. The folding-device 38 may also include the same means of temporarily securing the sealing-tape 18 as that of the platform 20.

The apparatus 12 also includes the pressing-device 42 configured to press the sealing-tape 18 and the separated wire-cables 28 into the cable-band 46. The cable-band 46, as used herein, is the evenly spaced wire-cables 28 disposed between the first-half 36 of the length 16 of the sealing-tape 18 and the second-half 40 of the length 16 of the sealing-tape 18. The pressing-device 42 may include a resilient pad (not specifically shown) configured to press the second-half 40 of the sealing-tape 18 into the spaces (i.e. gaps) between the wire-cables 28 (see FIG. 5). In the examples illustrated in FIGS. 2 and 5, the pressing-device 42 is integral to the folding-device 38. In another embodiment not shown, the pressing-device 42 is a separate component.

Figure 6A:
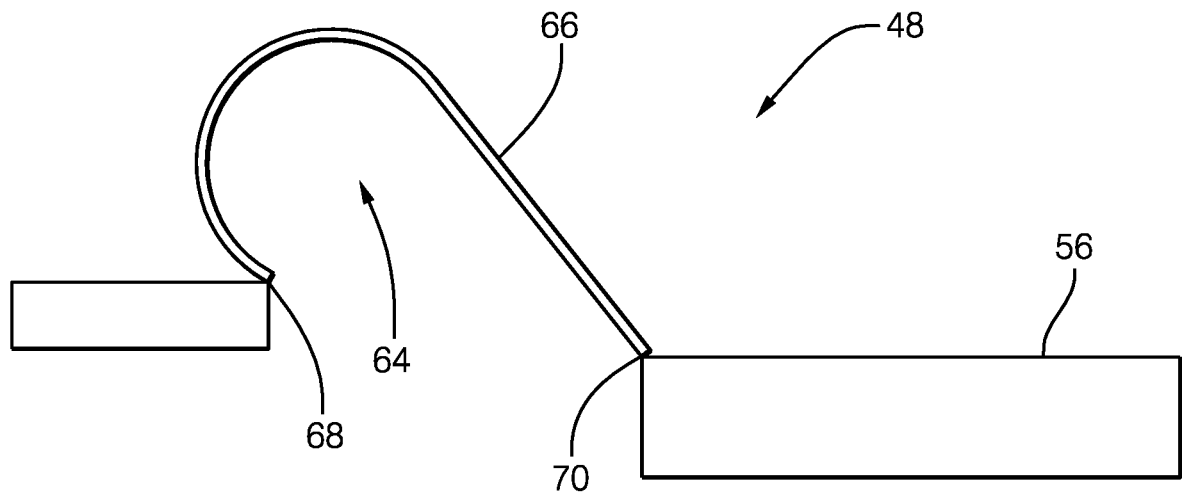
FIG. 6A is a section view illustrating one embodiment of a coiling-device of the apparatus of FIG. 2.
Figure 6B:
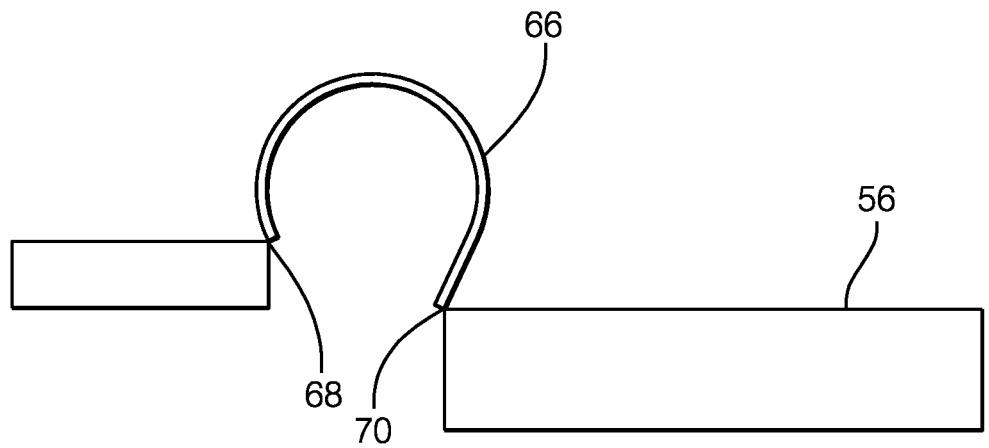
FIG. 6B is another section view illustrating the coiling-device of FIG. 6A.
Figure 6C:
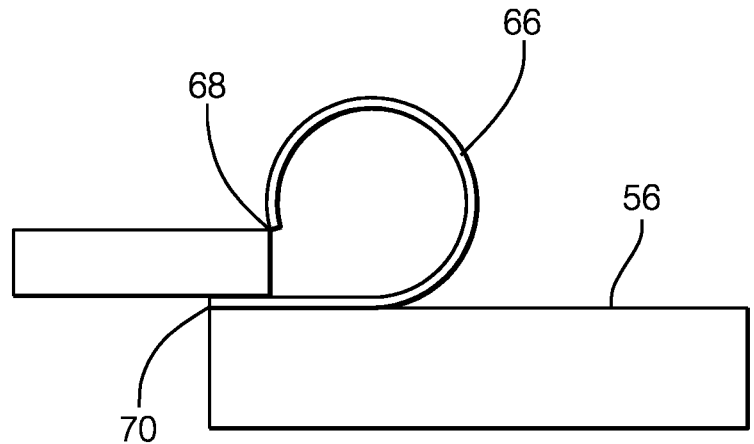
FIG. 6C is yet another section view illustrating the coiling-device of FIG. 6A.

FIGS. 6A to 6C illustrate a progression of one embodiment of the coiling-device 48 during the coiling process. The apparatus 12 also includes the coiling-device 48 configured to coil the cable-band 46 into the cylindrical-shaped seal 50. The coiling-device 48 includes a generally C-shaped 64 flexible-band 66 with a fixed-end 68 and a moving-end 70. The C-shaped 64 portion of the flexible-band 66 receives the cable-band 46, whereby the moving-end 70 is moved beyond the fixed-end 68 such that a coiling-motion is applied to the cable-band 46. That is, the two ends of the flexible-band 66 are brought together forming a circle with the cable-band 46 captured inside, and the diameter of the circle is reduced with a tourniquet-like tightening of the flexible-band 66. The flexible-band 66 is preferably formed of a stainless steel strip with a stiffness and a spring-force sufficient to retain the C-shape 64 through numerous coiling-cycles. The coiling-device 48 further includes a sliding-block 56 attached to the moving-end 70 of the flexible-band 66. The sliding-block 56 is actuated by the controller-circuit 72 when the cable-band 46 is moved into the coiling-device 48. The sliding-block 56 moves the moving-end 70 along the longitudinal-axis 22 beyond the fixed-end 68 thereby coiling and compressing the cable-band 46 as described in more detail below.

Figure 7A:
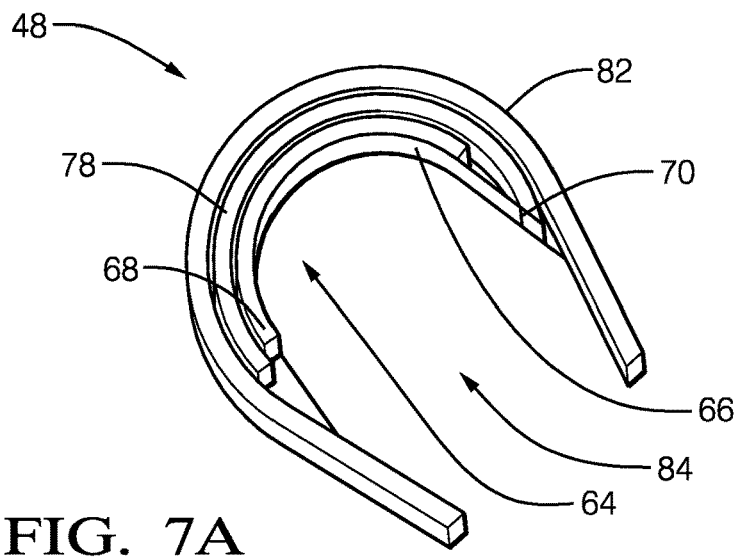
FIG. 7A is a section view illustrating another embodiment of a coiling-device of the apparatus of FIG. 2.
Figure 7B:
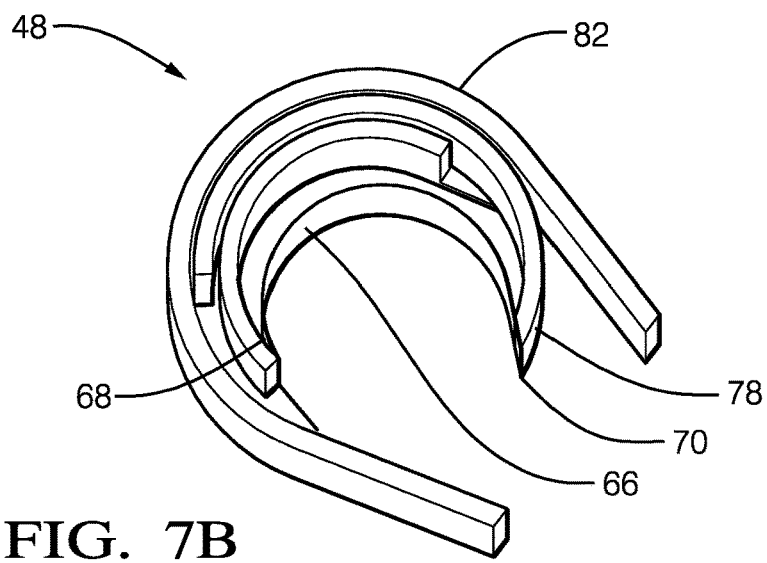
FIG. 7B is another section view illustrating the coiling-device of FIG. 7A.
Figure 7C:
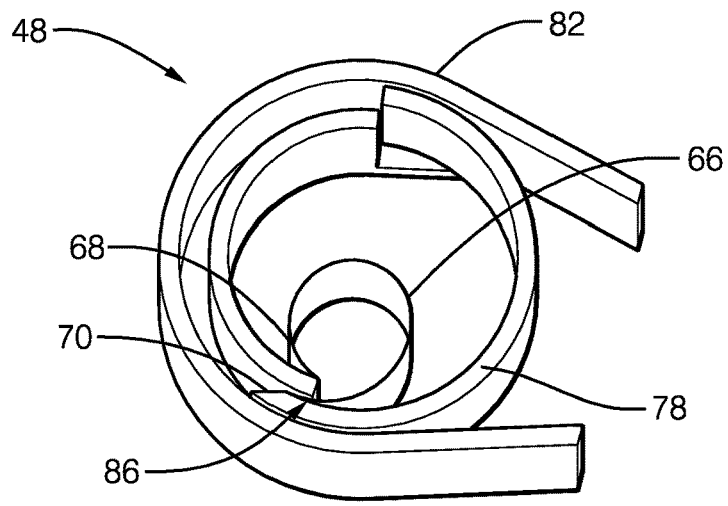
FIG. 7C is yet another section view illustrating the coiling-device of FIG. 7A.
Figure 8:
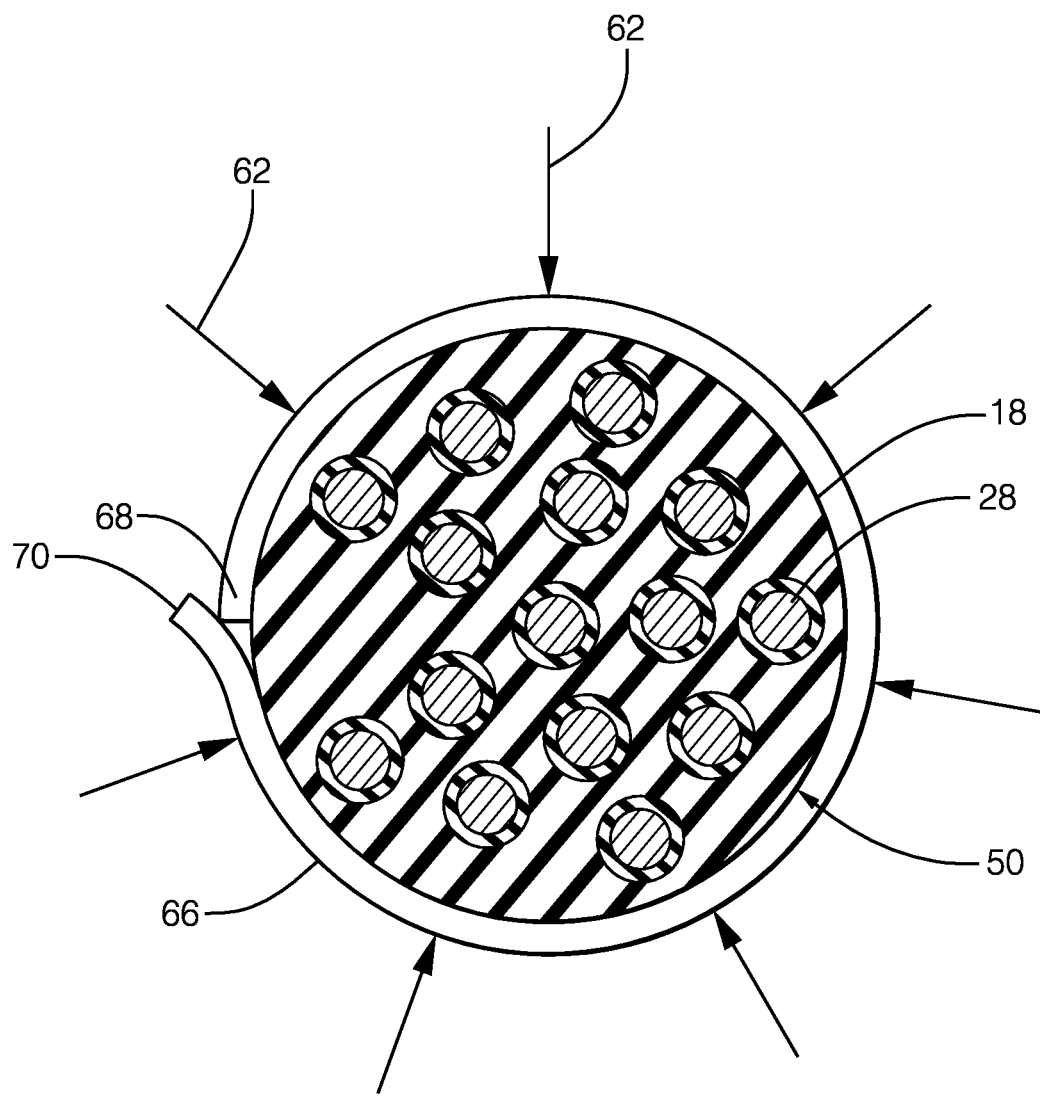
FIG. 8 is a section view illustrating a cylindrical-shaped seal.

FIGS. 7A to 7C illustrate a progression of another embodiment of the coiling-device 48 during the coiling-process. The coiling-device 48 further includes a pair of concentric semi-circular arcs 74 defining an inner-arc 78 and an outer-arc 82. That is, the concentric semi-circular arcs 74 are nested together and have a common center-point where a radius of the inner-arc 78 is less than the radius of the outer-arc 82. The outer-arc 82 is attached to the fixed-end 68 of the flexible-band 66 and remains stationary through the coiling-process. The inner-arc 78 is attached to the moving-end 70 of the flexible-band 66. The controller-circuit 72 actuates the inner-arc 78 and rotates the inner-arc 78 from an open-position 84 to a closed-position 86. The inner-arc 78 rotates the moving-end 70 along the longitudinal-axis 22 beyond the fixed-end 68 thereby coiling and compressing the cable-band 46 with the tourniquet-like motion as described above.

Referring back to FIG. 2, the apparatus 12 also includes a controller-circuit 72 in communication with the handling-device 32, the platform 20, the dispensing-device 14, the separation-device 30, the folding-device 38, the pressing-device 42, and the coiling-device 48. The controller-circuit 72 may include a processor (not shown) such as a microprocessor or other control circuitry such as analog and/or digital control circuitry including an application specific integrated circuit (ASIC) for processing data as should be evident to those in the art. The controller-circuit 72 may include a memory (not specifically shown), including non-volatile memory, such as electrically erasable programmable read-only memory (EEPROM) for storing one or more routines, thresholds, and captured data. The one or more routines may be executed by the processor to perform steps for sealing the wiring-harness 10 based on signals received from the handling-device 32, the platform 20, the dispensing-device 14, the separation-device 30, the folding-device 38, the pressing-device 42, and the coiling-device 48, as described herein.

The controller-circuit 72 is configured to present the wiring-harness 10 into the apparatus 12 with the handling-device 32 and dispense the length 16 of the sealing-tape 18 onto the platform 20 with the dispensing-device 14. The sealing-tape 18 has a first-surface 24 and a second-surface 26 opposite the first-surface 24 wherein the second-surface 26 is placed in contact with the platform 20. The sealing-tape 18 is preferably a butyl-rubber based sealing-tape 18 capable of forming a water-tight seal around the wire-cables 28. One such sealing-tape 18 is the DELRAY®-COLDMELT Manufactured by DSG-Canusa GmbH, of Rheinbach, Germany. Preferably, the sealing-tape 18 has a width of 19 mm and a thickness of 1.5 mm.

Figure 5:
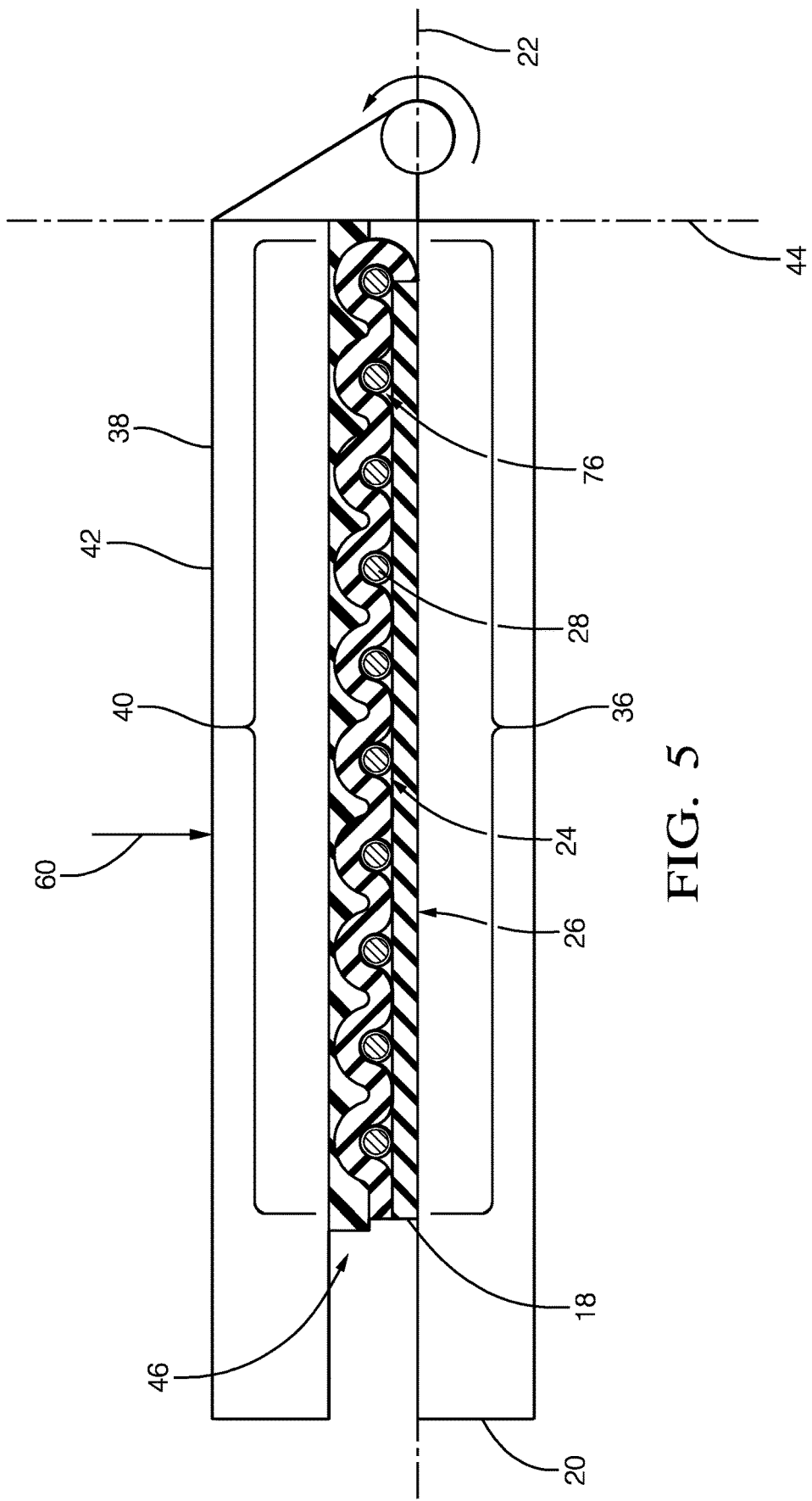
FIG. 5 is a section view illustrating a portion of the apparatus of FIG. 2.

FIG. 5 is a side section view of a portion of the apparatus 12 of FIG. 2 viewed along the lateral-axis 34 (see FIG. 1) during the folding 108 and pressing 110 steps. The controller-circuit 72 separates the wire-cables 28 by placing a portion of the wiring-harness 10 into the separation-device 30 with the handling-device 32, then applies the separated wire-cables 28 to the first-surface 24 of the sealing-tape 18 along the lateral-axis 34 of the platform 20. The lateral-axis 34 is orthogonal to the longitudinal-axis 22. The handling-device 32 places the separated wire-cables 28 onto the first-half 36 of the length 16 of the sealing-tape 18. The controller-circuit 72 actuates the folding-device 38 and folds the second-half 40 of the sealing-tape 18 over the separated wire-cables 28 such that the second-half 40 overlays the first-half 36. In the example illustrated in FIG. 5, the folding-device 38 rotates up from the platform 20 from a pivot-point proximate a mid-point of the length 16 of sealing-tape 18.

The controller-circuit 72 actuates the pressing-device 42 and presses the second-half 40 of the sealing-tape 18 along the vertical-axis 44 of the platform 20, the vertical-axis 44 orthogonal to both the longitudinal-axis 22 and the lateral-axis 34, such that the second-half 40 contacts the first-half 36 between the separated wire-cables 28, thereby forming the cable-band 46. The controller-circuit 72 preferably presses the second-half 40 of the sealing-tape 18 with a pressing-force 60 of between 100-Newtons and 300-Newtons. A beneficial self-adhering property of the sealing-tape 18 enables the cable-band 46 to remain intact after the pressing-force 60 is released with interstitial-voids 76 (i.e. gaps, spaces, etc.) remaining between the wire-cables 28 and the sealing-tape 18, as illustrated in FIG. 5.

FIG. 7 illustrates the flexible-band 66 isolated from the coiling-device 48 with the coiled cable-band 46 being compressed within. The controller-circuit 72 actuates the handling-device 32 to move the cable-band 46 into the coiling-device 48 and coils the cable-band 46 along the longitudinal-axis 22 into the cylindrical-shaped seal 50 such that the second-surface 26 of the sealing-tape 18 is in direct contact with the first-surface 24 of the sealing-tape 18. The controller-circuit 72 compresses the cylindrical-shaped seal 50 isostatically with the coiling-device 48, such that the interstitial-voids 76 within the cylindrical-shaped seal 50 are reduced in size. Preferably, the controller-circuit 72 compresses the cylindrical-shaped seal 50 with an isostatic-force 62 of between 40-Newtons and 200-Newtons. The resulting cylindrical-shaped seal 50 is generally round in cross-section, and has a minimal number of interstitial-voids 76 (preferably zero) to meet the requirements of a leak-test performed in the leak-test-device 58 at room temperature for 50-seconds at 200 mbar delta pressure, where preferably zero leakage is measured.

In another embodiment, the apparatus 12 further includes the wrapping-device 52 (see FIG. 2) in communication with the controller-circuit 72, wherein the controller-circuit 72 is further configured to spirally wrap the cylindrical-shaped seal 50, and a portion of the wire-cables 28 extending beyond the cylindrical-shaped seal 50, in the polymer-film 54 (such as a vinyl-tape). The polymer-film 54 helps protect the cylindrical-shaped seal 50 and dresses the wire-cables 28 as they exit the cylindrical-shaped seal 50.

In another embodiment, the apparatus 12 further includes an insertion-device 80 (see FIG. 2) in communication with the controller-circuit 72, wherein the controller-circuit 72 is further configured to insert the cylindrical-shaped seal 50 into a sealing-grommet that may be used to seal an aperture in a vehicle-body. The cylindrical-shaped seal 50 and sealing-grommet may also be leak-tested in the leak-test-device 58 at room temperature for 50-seconds at 200 mbar delta pressure, where preferably zero leakage is measured. The sealing-grommet may be any sealing-grommet, and is preferably formed of a rubber-based compound.

A technical benefit of the above apparatus 12 is that the apparatus 12 performs the sealing-process in a temperature range between 10 degrees Celsius and 38 degrees Celsius, and requires no additional heating of the sealing-tape 18.

The invention claimed is:

1. A method of sealing a wiring harness, comprising:
 a) dispensing a length of a sealing tape onto a platform and a folding device along a longitudinal axis of the platform, the sealing tape having a first surface and a second surface opposite the first surface, the second surface in contact with the platform, wherein the folding device is recessed into the platform to provide a continuous surface on which the sealing tape is dispensed;
 b) separating a plurality of wire cables from a portion of the wiring harness with a separation device such that the plurality of wire cables are generally parallel and evenly spaced;
 c) applying the separated plurality of wire cables to the first surface of the sealing tape along a lateral axis of the platform with a handling device, wherein the lateral axis is orthogonal to the longitudinal axis and wherein the separated plurality of wire cables is applied over generally a first half of the length of the sealing tape;
 d) folding a second half of the sealing tape over the separated plurality of wire-cables by rotating the folding device around a pivot point proximate a mid-point of the length of sealing tape such that the second half overlays the first half;
 e) pressing the second half of the sealing tape along a vertical axis of the platform with a pressing device such that the second half contacts the first half between the separated plurality of wire cables, thereby forming a cable band, wherein the vertical axis is orthogonal to both the longitudinal axis and the lateral axis;
 f) coiling the cable band along the longitudinal axis into a generally cylindrical shaped seal with a coiling device such that the second surface of the sealing tape is in direct contact with the first surface of the sealing tape; and
 g) isostatically compressing the cylindrical shaped seal with the coiling device such that interstitial voids within the cylindrical shaped seal are reduced in size.

2. The method according to claim 1, further comprising the step of:
 h) wrapping the cylindrical shaped seal and a portion of the plurality of wire cables extending beyond the cylindrical shaped seal in a polymer film.

3. The method according to claim 1, further comprising the step of:
 i) inserting the cylindrical shaped seal into a sealing grommet with the handling device.

4. The method according to claim 1, further comprising: leak testing the cylindrical shaped seal at room temperature for 50 seconds at 200 mbar delta pressure.

5. The method according to claim 1, wherein step b) further includes the step of:

b1) separating the plurality of wire cables in a range of 2 mm to 5 mm apart from one another.

6. The method according to claim 1, wherein step e) further includes the step of:
 e1) pressing with a pressing force of between 100 Newtons and 300 Newtons.

7. The method according to claim 1, wherein step g) further includes the step of:
 g1) compressing with an isostatic force of between 40 Newtons and 200 Newtons.

8. The method according to claim 1, wherein the sealing process is conducted in a temperature range between 10 degrees Celsius and 38 degrees Celsius.

9. A wiring harness sealing apparatus configured to feed a wiring harness through a sealing process, said apparatus comprising:
 a handling device configured to manipulate the wiring harness;
 a platform configured to receive a length of a sealing tape along a longitudinal axis of the platform;
 a dispensing device configured to dispense the sealing tape onto the platform;
 a separation device configured to separate a plurality of wire cables within the wiring harness;
 the separation device further configured to retain the plurality of wire cables such that the plurality of wire cables are generally parallel and evenly spaced;
 a folding device having a pivot point configured to fold the sealing tape over the separated plurality of wire cables, wherein the folding device is recessed into the platform to provide a continuous surface on which the sealing tape is dispensed;
 a pressing device configured to press the sealing tape and separated plurality of wire cables into a cable band;
 a coiling device configured to coil the cable band; and
 a controller circuit in communication with the handling device, the platform, the dispensing device, the separation device, the folding device, the pressing device, and the coiling device, characterized in that the controller circuit is configured to:
 present the wiring harness into the apparatus with the handling device;
 dispense the length of the sealing tape onto the platform with the dispensing device;
 the sealing tape having a first surface and a second surface opposite the first surface, the second surface in contact with the platform;
 separate the plurality of wire cables by placing a portion of the wiring harness into the separation device, with the handling device;
 apply, with the handling device, the separated plurality of wire cables to the first surface of the sealing tape along a lateral axis of the platform, the lateral axis orthogonal to the longitudinal axis;
 the handling device placing the separated plurality of wire cables onto a first half of the length of the sealing tape;
 fold, with the folding device, a second half of the sealing tape over the separated plurality of wire cables such that the second half overlays the first half by rotating the folding device around the pivot point;
 press, with the pressing device, the second half of the sealing tape along a vertical axis of the platform, the vertical axis orthogonal to both the longitudinal axis and the lateral axis, such that the second half contacts the first half between the separated plurality of wire cables, thereby forming the cable band;

coil the cable band, with the coiling device, along the longitudinal axis into a generally cylindrical shaped seal such that the second surface of the sealing tape is in direct contact with the first surface of the sealing tape; and compress the cylindrical shaped seal isostatically, with the coiling device, such that interstitial voids within the cylindrical shaped seal are reduced in size.

10. The apparatus according to claim 9, wherein the separation device includes a plurality of pairs of opposed wire separators aligned along the lateral axis, the plurality of pairs of opposed wire separators evenly spacing the plurality of wire cables apart from one another, the plurality of pairs of opposed wire separators each having a first leg and a second leg connected by an arc, the first leg parallel to the second leg, the plurality of pairs of opposed wire separators exerting a clamping force on the separated plurality of wire cables disposed between adjacent pairs of opposed wire separators.

11. The apparatus according to claim 9, wherein the handling device includes grippers actuated by the controller circuit, the grippers holding the wiring harness parallel to the lateral axis and inhibiting movement of the wiring harness along the lateral axis.

12. The apparatus according to claim 9, wherein the coiling device includes a generally C-shaped flexible band having a fixed end and a moving end, the C-shaped portion of the flexible band receiving the cable band, whereby the moving end is moved beyond the fixed end imparting a coiling motion on the cable band.

13. The apparatus according to claim 12, wherein the coiling device further includes a sliding block attached to the moving end of the flexible band, the sliding block actuated by the controller circuit, whereby the sliding block moves the moving end along the longitudinal axis beyond the fixed end thereby coiling and compressing the cable band.

14. The apparatus according to claim 12, wherein the coiling device further includes a pair of concentric semi circular arcs defining an inner arc and an outer arc, the inner arc attached to the moving end of the flexible band, the inner arc actuated by the controller circuit and rotatable from an open position to a closed position, the outer arc attached to the fixed end of the flexible band, whereby the inner arc rotates the moving end along the longitudinal axis beyond the fixed end thereby coiling and compressing the cable band.

* * * * *